(12) United States Patent
Horng et al.

(10) Patent No.: US 6,674,204 B1
(45) Date of Patent: Jan. 6, 2004

(54) MAGNET-POSITIONING DEVICE FOR ROTOR

(75) Inventors: Alex Horng, Kaohsiung (TW); Yin-Rong Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/330,118

(22) Filed: Dec. 30, 2002

(51) Int. Cl.$^7$ ............................................... H02K 21/12
(52) U.S. Cl. ........................... 310/156.12; 310/156.12; 310/156.29; 310/156.14; 310/68 R
(58) Field of Search ...................... 310/156.12, 156.29, 310/156.14, 68 R

(56) References Cited

U.S. PATENT DOCUMENTS

| | | | |
|---|---|---|---|
| 4,682,065 A | * 7/1987 | English | 310/90 |
| 6,050,785 A | * 4/2000 | Horng | 417/354 |
| 6,109,890 A | * 8/2000 | Horng | 417/423.14 |
| 6,307,291 B1 | * 10/2001 | Iwaki | 310/90 |
| 6,396,190 B1 | * 5/2002 | Ahn | 310/261 |
| 6,400,053 B1 | * 6/2002 | Horng | 310/91 |
| 6,483,209 B1 | * 11/2002 | Horng | 310/51 |

\* cited by examiner

*Primary Examiner*—Karl Tamai
*Assistant Examiner*—Iraj A. Mohandesi
(74) *Attorney, Agent, or Firm*—Bacon & Thomas, PLLC

(57) ABSTRACT

A magnet-positioning device for a rotor in accordance with the present invention mainly comprises a rotor hub, a metal casing, and an annular magnet. The rotor hub includes an annular wall and an engaging portion formed thereon. The engaging portion is adapted to engage with the metal casing, which is integrally adhered with the annular magnet. The metal casing includes a first end edge and a second end edge, and an outer diameter formed by the second end edge is slightly greater than an inner diameter formed by the engaging portion.

12 Claims, 6 Drawing Sheets

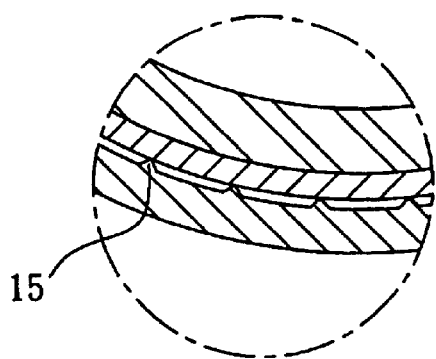
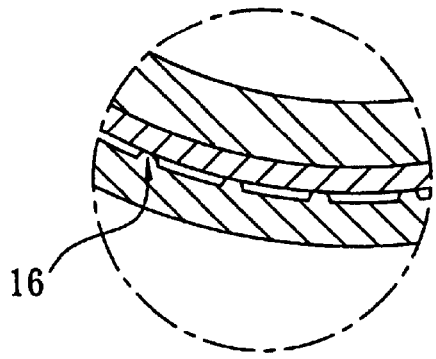
FIG. 7   FIG. 8
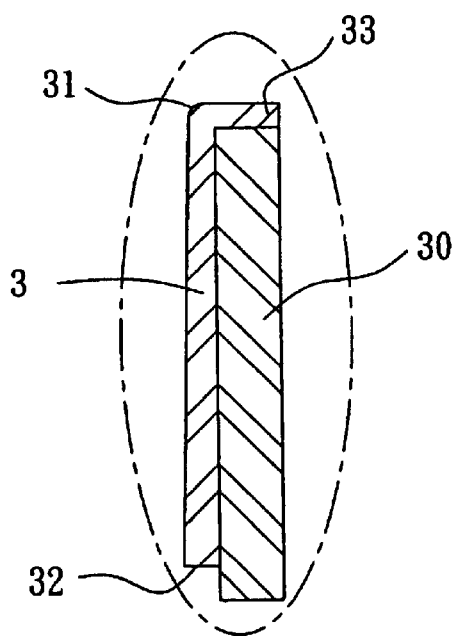
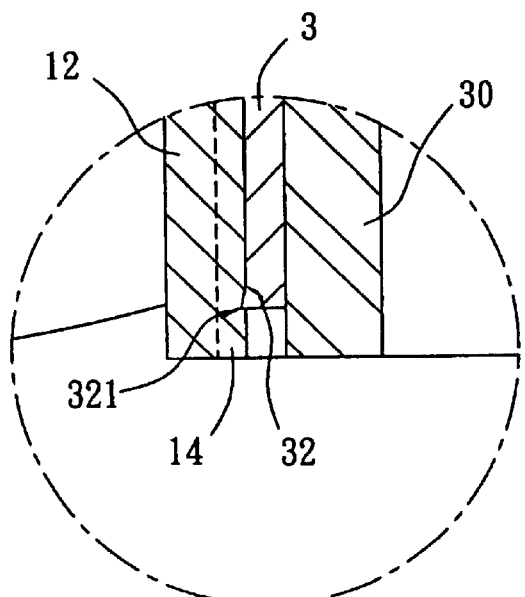
FIG. 9   FIG. 10

MAGNET-POSITIONING DEVICE FOR ROTOR

BACKGROUND OF THE INVENTION

1. Field of the Invention

The present invention is related to a magnet-positioning device for a rotor and more particularly to the magnet-positioning device having assembling members adapted to combine a metal casing convenient with a rotor hub.

2. Description of the Related Art

A traditional fan rotor has a magnet and a metal casing attached thereto, which are embedded in a mold of a fan wheel. A hub of the fan wheel encompasses the magnet and the metal casing, and is integrally formed by plastic injection molding. In order to maintain balanced rotation of the fan wheel, the fan wheel, the magnet and the metal casing are formed as a singular member in the manufacturing process. However, in the mold assembly the fan wheel must be injected one at a time. If more than two fan wheels are injected at a time, the temperature in the mold cannot be controlled precisely due to the different temperatures of more than two sets of the magnet and the metal casing prior to being contained in the mold. The different temperatures in the mold result in different molding flow of plastic therein. This causes a fan wheel product mismatch. Consequently, the multi-molding process fails to accomplish the specific balancing rotation of each fan wheel manufactured by a single-molding process. Still, the single-molding process reduces manufacturing efficiency and increases manufacturing cost.

Referring to FIG. 1, a conventional fan wheel includes a rotor 90, a hub 91, and a plurality of resilient members 92. Each end of the resilient members 92 is provided with an engaging hook 93 adapted to engage with a metal casing 94, which is attached to a magnet. The resilient members 92 are integrally formed with the hub 91 so that a great many of the fan wheels may be injected at one time in the molding process. However, the resilient members 92 complicate the entire mold structure of the fan wheel and increase the manufacturing cost of the mold.

The present invention intends to provide a magnet-positioning device for a rotor having assembling members adapted to combine a metal casing with a rotor hub in such a way to mitigate and overcome the above problem.

SUMMARY OF THE INVENTION

The primary objective of this invention is to provide a magnet-positioning device for a rotor having assembling members adapted to combine a metal casing with a rotor hub.

The magnet-positioning device for the rotor in accordance with the present invention mainly comprises a rotor hub, a metal casing, and an annular magnet. The rotor hub includes an annular wall and an engaging portion formed thereon. The engaging portion is adapted to engage with the metal casing, which is integrally adhered with the annular magnet. The metal casing includes a first end edge and a second end edge, and an outer diameter formed by the second end edge is slightly greater than an inner diameter formed by the engaging portion.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein:

FIG. 7 is an enlarged view, taken at 7 in FIG. 6 of a magnet-positioning device for the rotor in accordance with the first embodiment of the present invention;

FIG. 8 is an enlarged view, taken at 8 in FIG. 6 of a magnet-positioning device for the rotor in accordance with the first embodiment of the present invention;

FIG. 9 is a partial cross-sectional view of a combined metal casing/magnet in accordance with a second embodiment of the present invention;

FIG. 10 is a partially enlarged cross-sectional view of the magnet-positioning device for the rotor in accordance with the second embodiment of the present invention;

DETAILED DESCRIPTION OF THE INVENTION

Figure 1:
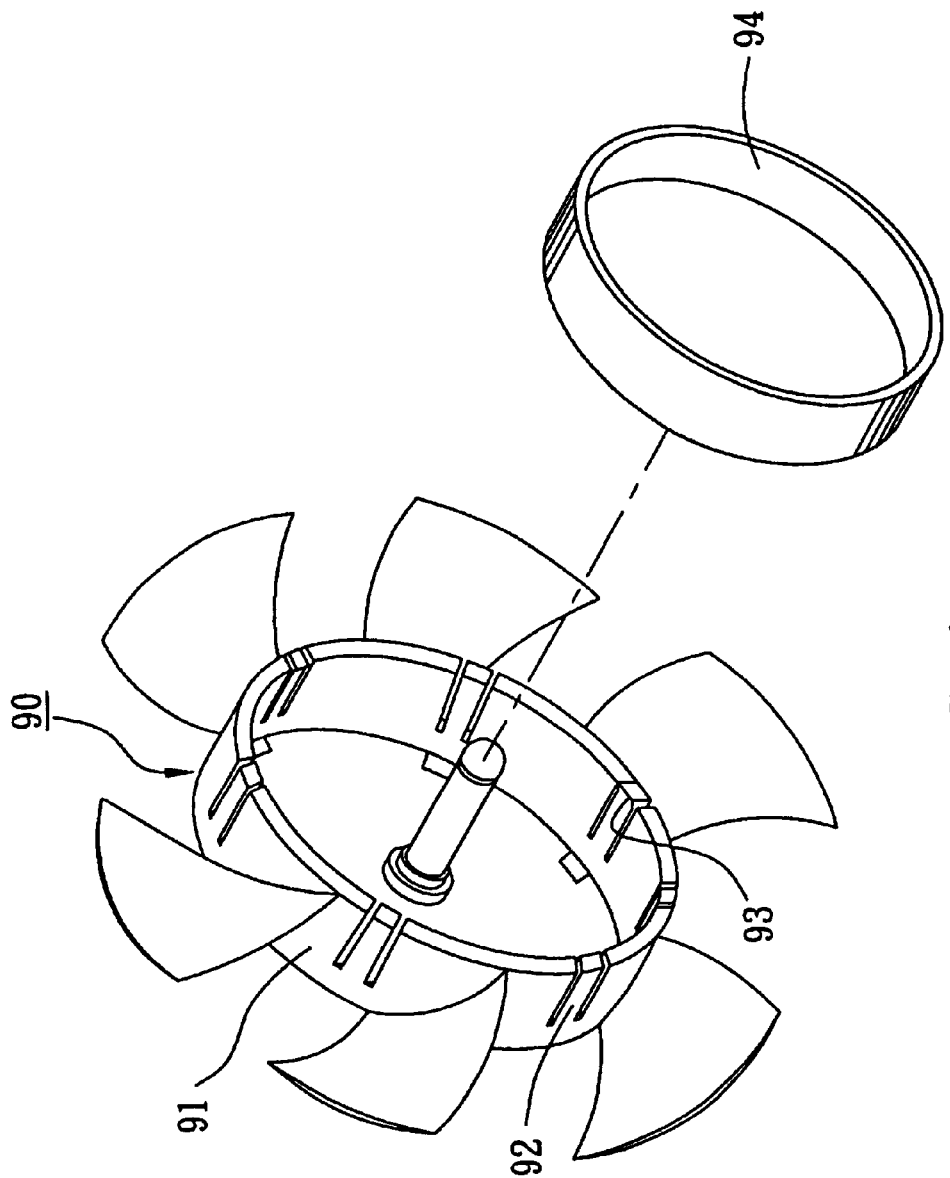
FIG. 1 is an exploded perspective view of a conventional fan wheel in accordance with the prior art.

Referring now to the drawings, there are three embodiments of the present invention shown therein, which include generally a primary rotor hub member and a secondary metal casing member.

Figure 2:
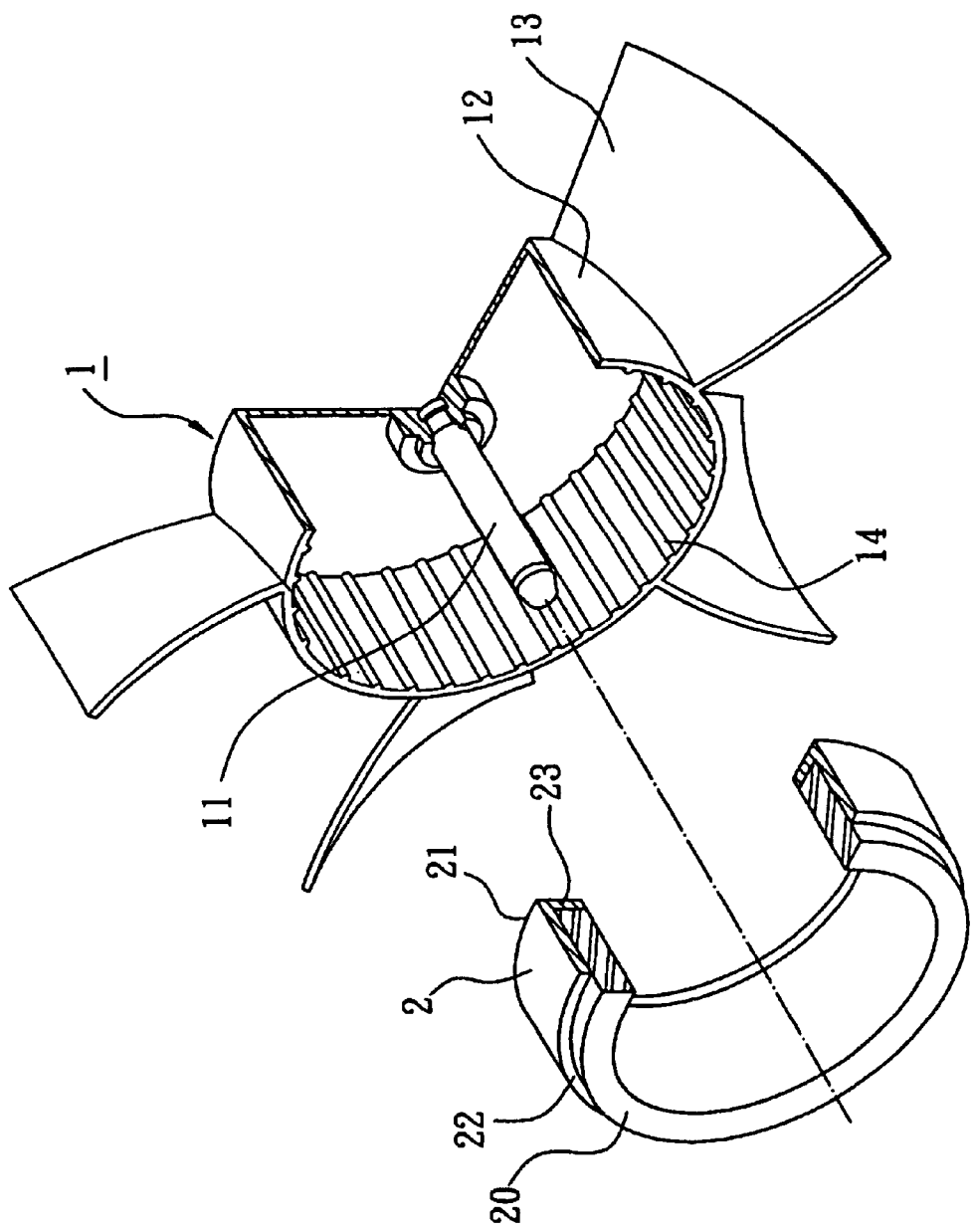
FIG. 2 is an exploded perspective view of a magnet-positioning device for a rotor in accordance with a first embodiment of the present invention.
Figure 3:
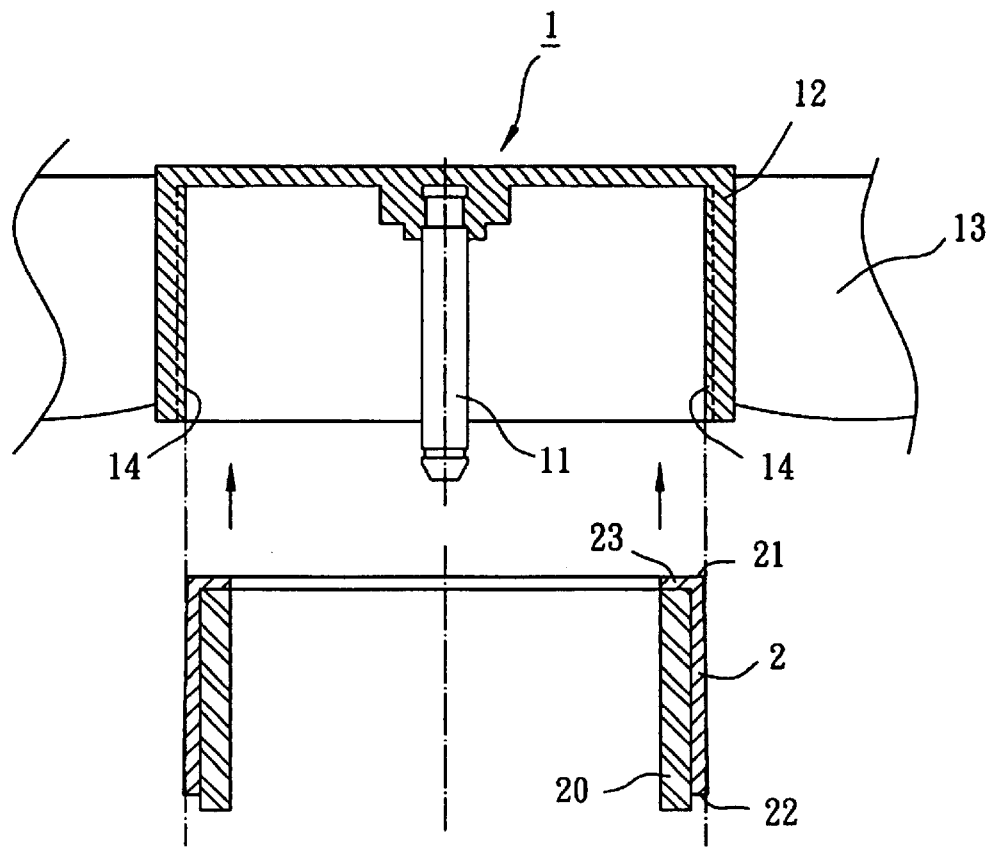
FIG. 3 is an exploded cross-sectional view of the magnet-positioning device for the rotor in accordance with the first embodiment of the present invention.

Referring to FIGS. 2 and 3, a rotor hub 1 of the first embodiment includes a shaft 11, an annular wall 12, and a plurality of blades 13. The shaft 11, axially extended from the rotor hub 1, is radially surrounded with the annular wall 12. The blades 13 are radially extended from the annular wall 12. The rotor hub 1 further include an engaging portion 14 formed as a rough surface or a plurality of axial prisms.

Referring again to FIGS. 2 and 3, a metal casing 2 is adhered with an annular magnet 20 to form as a unit. The metal casing 2 includes a first end edge 21 and a second end edge 22 from which an annular flange 23 is extended. The annular flange 23 is used to confine an end edge of the annular magnet 20 within the metal casing 2. Moreover, an outer diameter formed by the second end edge 22 is slightly greater than that formed by the first end edge 21 and an inner diameter formed by the engaging portion 14.

Figure 4:
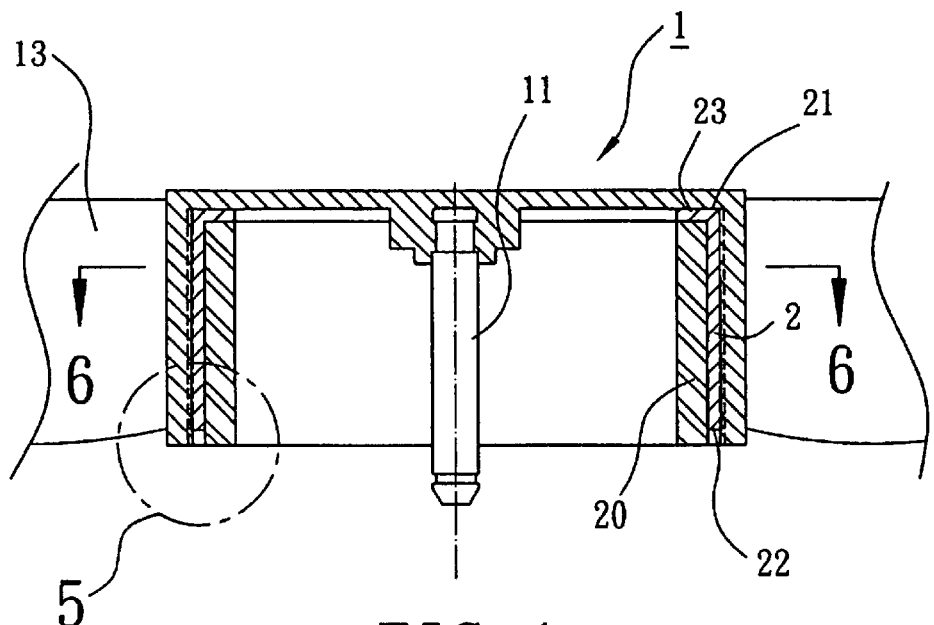
FIG. 4 is a cross-sectional view of the magnet-positioning device for the rotor in accordance with the first embodiment of the present invention.
Figure 5:
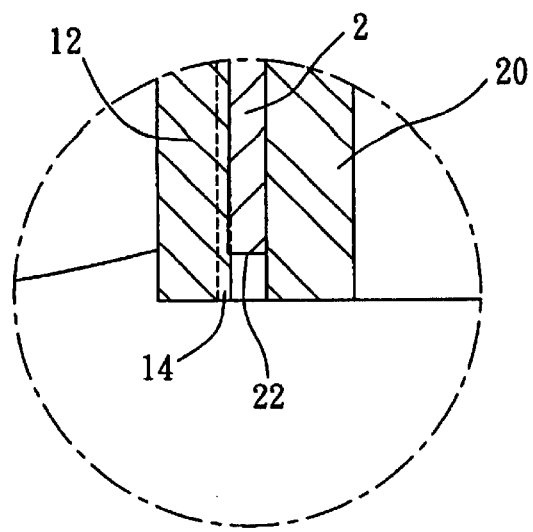
FIG. 5 is an enlarged cross-sectional view of the magnet-positioning device for the rotor in accordance with the first embodiment of the present invention.

Referring to FIGS. 4 and 5, during assembly, the first end edge 21 of the metal casing 2 is initially inserted into a space formed by the engaging portion 14 of the rotor hub 1. The entire body of the metal casing 2 is completely encompassed in the rotor hub 1 while being forced by a press machine. In this circumstance, the second end edge 22 of the metal casing 2 is fittingly engaged with the engaging portion 14 of the rotor hub 1.

Figure 6:
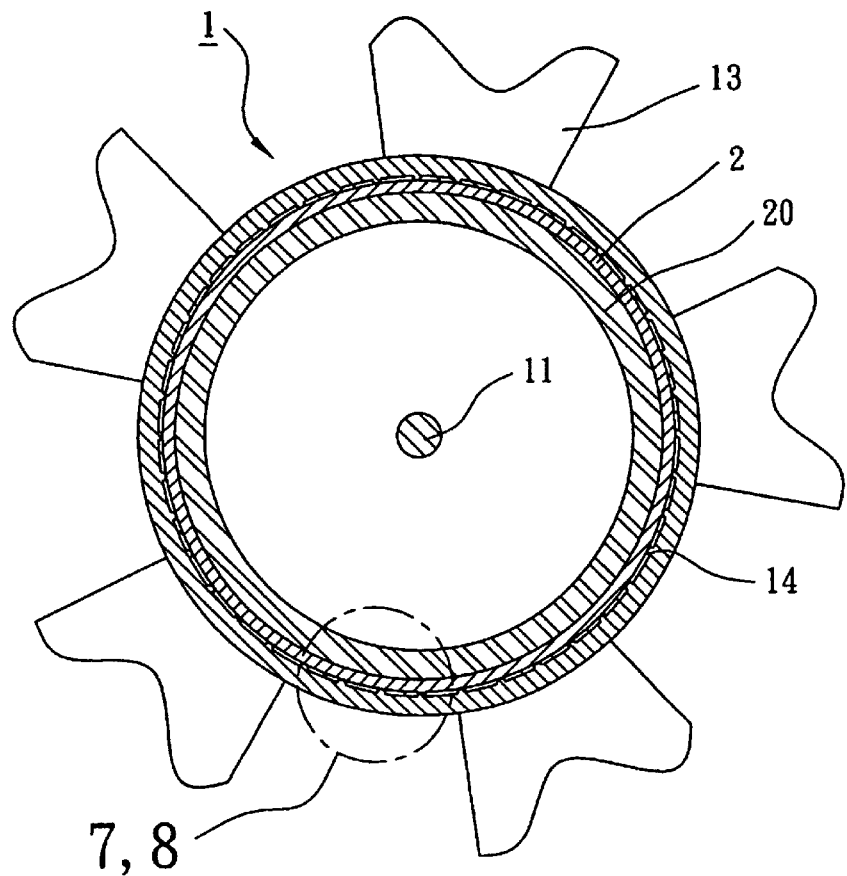
FIG. 6 is a cross-sectional view, taken along line 6—6 in FIG. 4, of the magnet-positioning device for the rotor in accordance with the first embodiment of the present invention.

Referring to FIGS. 6, 7 and 8, the engaging portion 14 is made of plastic material and thereby deformed when it is forced to engage with metal casing 2. Preferably, a topmost portion of the axial prism has a semicircular cross-section, a triangular cross-section 15, as shown in FIG. 7, and an arc recessed cross-section 16, as shown in FIG. 8.

Referring to FIG. 9, a metal casing 3 is adhered to an annular magnet 30 to form a unit. The metal casing 3 includes a first end edge 31 and a second end edge 32 from which an annular flange 33 is extended. The annular flange 33 is confronted with an end edge of the annular magnet 30. Moreover, the first end edge 31 is formed with an arc surface while the second end edge 32 is formed with an outer sharpened edge.

Referring to FIG. 10, when the first end edge 31 of the metal casing 3 is inserted into a space formed by the engaging portion 14, the outer sharpened edge of the second end edge 32 is slightly embedded in the engaging portion 14 of the rotor hub 1. Consequently, the engagement of the metal casing 3 with the rotor hub 1 is improved. Preferably, the outer sharpened edge 321 is formed with a right angle or an acute angle.

Figure 11:
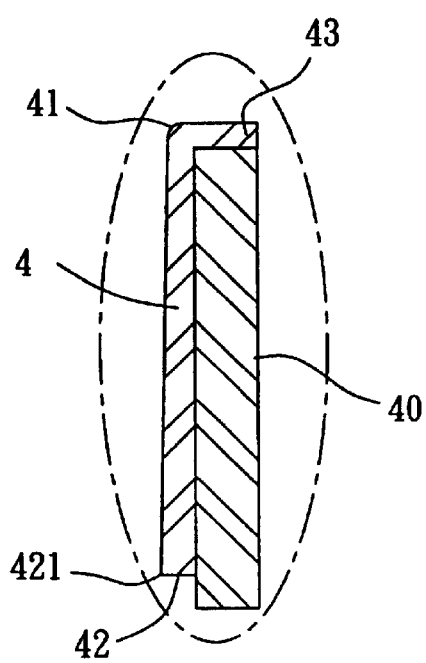
FIG. 11 is a partial cross-sectional view of a combined metal casing/magnet in accordance with a third embodiment of the present invention.

Referring to FIG. 11, a metal casing 4 is adhered to an annular magnet 40 to form a unit. The metal casing 4 includes a first end edge 41 and a second end edge 42 from which an annular flange 43 is extended the annular flange 43 is confronted with an end edge of the annular magnet 40. Moreover, the first end edge 41 is formed with an arc surface while the second end edge 42 is formed with a preformed outer burr.

Figure 12:
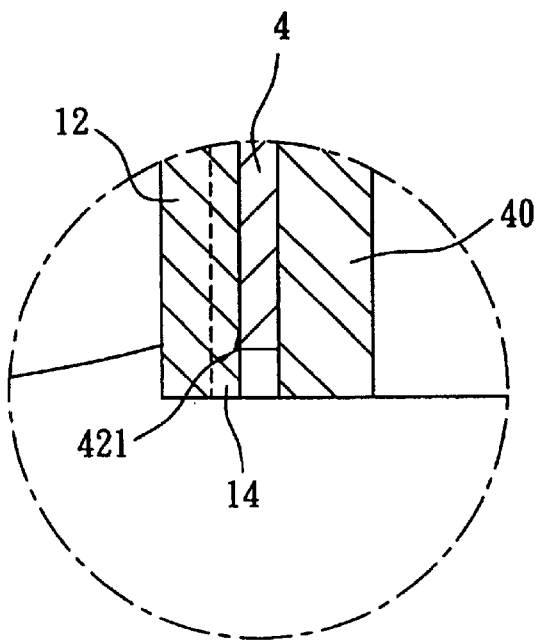
FIG. 12 is a partially enlarged cross-sectional view of the magnet-positioning device for the rotor in accordance with the third embodiment of the present invention.

Referring to FIG. 12, when the first end edge 41 of the metal casing 4 is inserted into a space formed by the engaging portion 14, the outer burr 421 of the second end edge 42 is slightly embedded in the engaging portion 14 of the rotor hub 1. Consequently, the engagement of the metal casing 3 with the rotor hub 1 is improved.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A rotor comprising:

a rotor hub having a shaft axially extended therefrom, and an annular wall surrounding the shaft, the annular wall including an inner surface provided with an engaging portion; and a metal casing being adhered with an annular magnet, the metal casing including a first and edge provided with a first outer diameter, and a second end edge provided with a second outer diameter, the second outer diameter is slightly grater than an inner diameter formed by the engaging portion;

wherein the second end edge is fittingly engaged with the engaging portion after the metal casing is forced to insert into the rotor hub.

2. The rotor as defined in claim 1, wherein the engaging portion is a rough surface.

3. The rotor as defined in claim 1, wherein the engaging portion is a plurality of axial prisms.

4. The rotor as defined in claim 3, wherein the prism has a topmost portion formed with a semicircular cross-section.

5. The rotor as defined in claim 3, wherein the prism has a topmost portion formed with a triangular cross-section.

6. The rotor as defined in claim 3, wherein the prism has a topmost portion formed with an arc recessed cross-section.

7. The rotor as defined in claim 1, wherein the first end edge including an annular flange extended therefrom.

8. The rotor as defined in claim 1, wherein the second outer diameter is slightly greater than the first outer diameter.

9. The rotor as defined in claim 1, wherein the first end edge is formed with an arc surface.

10. The rotor as defined in claim 1, wherein the second end edge includes an outer sharpened edge formed with a right angle.

11. The rotor as defined in claim 1, wherein the second end edge includes an outer sharpened edge formed with an acute angle.

12. The rotor as defined in claim 1, wherein the second end edge includes a preformed outer burr.

* * * * *